US011096073B2

(12) United States Patent
Ponnuswamy

(10) Patent No.: US 11,096,073 B2
(45) Date of Patent: Aug. 17, 2021

(54) DETERMINING A PERFORMANCE CRITERION FOR A WIRELESS DEVICE

(71) Applicant: Facebook, Inc, Menlo Park, CA (US)

(72) Inventor: Subbu Ponnuswamy, Saratoga, CA (US)

(73) Assignee: Facebook, Inc., Menlo Park, CA (US)

( * ) Notice: Subject to any disclaimer, the term of this patent is extended or adjusted under 35 U.S.C. 154(b) by 639 days.

(21) Appl. No.: 15/043,847

(22) Filed: Feb. 15, 2016

(65) Prior Publication Data
US 2017/0238199 A1  Aug. 17, 2017

(51) Int. Cl.
H04W 24/08 (2009.01)
H04L 12/24 (2006.01)
H04L 12/26 (2006.01)
G06F 8/65 (2018.01)

(52) U.S. Cl.
CPC .............. *H04W 24/08* (2013.01); *G06F 8/65* (2013.01); *H04L 41/082* (2013.01); *H04L 41/0816* (2013.01); *H04L 43/16* (2013.01)

(58) Field of Classification Search
None
See application file for complete search history.

(56) References Cited

U.S. PATENT DOCUMENTS 7,716,047 B2 * 5/2010 Hernandez-Abrego ..................... G10L 15/28 704/231
9,483,887 B1 * 11/2016 Soleimani .......... G07C 9/00007
2002/0097264 A1 * 7/2002 Dutta .................. G06F 8/00 715/745
2008/0186882 A1 * 8/2008 Scherzer ............... H04W 72/02 370/310
2011/0009056 A1 * 1/2011 Hanson ................. H04W 40/22 455/9
2011/0051673 A1 * 3/2011 Roberts ............. H04W 72/1231 370/329
2011/0216692 A1 * 9/2011 Lundsgaard .......... H04W 48/20 370/328
2011/0263244 A1 * 10/2011 Kobayashi ............ H04W 24/08 455/423
2013/0090128 A1 * 4/2013 Sawamoto ............ H04W 16/18 455/452.2
2013/0217358 A1 * 8/2013 Snider ............... H04W 12/1202 455/411
2014/0059218 A1 * 2/2014 Ganu ................... H04W 16/14 709/224
2015/0023193 A1 * 1/2015 Zhang .................. H04W 24/10 370/252
2017/0230849 A1 * 8/2017 Wei ...................... H04B 17/336

* cited by examiner

*Primary Examiner* — Jeffrey M Rutkowski
*Assistant Examiner* — Mehedi S Aley
(74) *Attorney, Agent, or Firm* — Brian R. Short

(57) ABSTRACT

Techniques are disclosed for determining a performance criterion for a client device. A performance criterion for a client device may be determined based on a rate of mobility of a client device. Additionally or alternatively, a performance criterion for a client device associated with a particular attribute may be determined based on performance levels of a set of client devices associated with the same particular attribute. The performance criterion is used to evaluate a performance level of a client device. If the performance criterion is not satisfied, then a wireless configuration is modified to improve the performance level.

18 Claims, 5 Drawing Sheets

DETERMINING A PERFORMANCE CRITERION FOR A WIRELESS DEVICE

TECHNICAL FIELD

The present disclosure relates to a performance criterion for a wireless environment. In particular, the present disclosure relates to determining a performance criterion for a wireless device.

BACKGROUND

In recent years, Wireless Local Area Network (WLAN) technologies have emerged as a fast-growing market. Among the various WLAN technologies, the Institute of Electrical and Electronics Engineers (IEEE) 802.11 standard is the dominating technology and is frequently used for WLANs. The IEEE 802.11 standard includes operations in one or more bands (such as the 2.400-2.500 GHz band and/or the 4.915-5.825 GHz band), and multiple channels within each band.

Client devices within WLANs wirelessly communicate with network devices. A client device may communicate with a network device to obtain access to a network resource. Alternatively, a client device may receive broadcast data from a network device, even if the client device had not requested access to a network resource. The client device may connect to the network resource only in response to a request or trigger. Network devices, such as access points, are digital devices that may be communicatively coupled to one or more networks (e.g., Internet, an intranet, etc.). Network devices may be directly connected to the one or more networks or connected via a controller. A network device, as referred to herein, may include a wireless Access Point (AP) that communicates wirelessly with devices using Wi-Fi, WiGig, Zigbee, Bluetooth or related standards and that communicates with a wired network. A network device may provide a wireless coverage area, within which devices may wirelessly connect to a network through the network device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

One or more embodiments include determining a performance criterion for a client device based on a rate of mobility of the client device. A rate of mobility may be, for example, a speed and/or velocity at which the client device is moving. Additionally or alternatively, a rate of mobility of a client device may be a rate at which other wireless devices are moving relative to the client device. The performance criterion, determined based on the rate of mobility, is used to evaluate a performance level of the client device. If the performance level of the client device does not satisfy the performance criterion, then a wireless configuration is modified to improve the performance level.

One or more embodiments include determining a performance criterion for a particular client device based on performance levels of a set of client devices associated with a common attribute. The common attribute may be, for example, be a same application and/or operating system executing on the set of client devices. As another example, the common attribute may be an interference level detected by a set of client devices within a particular geographical vicinity. The performance criterion is used to evaluate a performance level of a particular client device associated with the same common attribute. If a performance level of the particular client device does not satisfy the performance criterion, then a wireless configuration is modified to improve the performance level.

2. Architectural Overview

Figure 1:
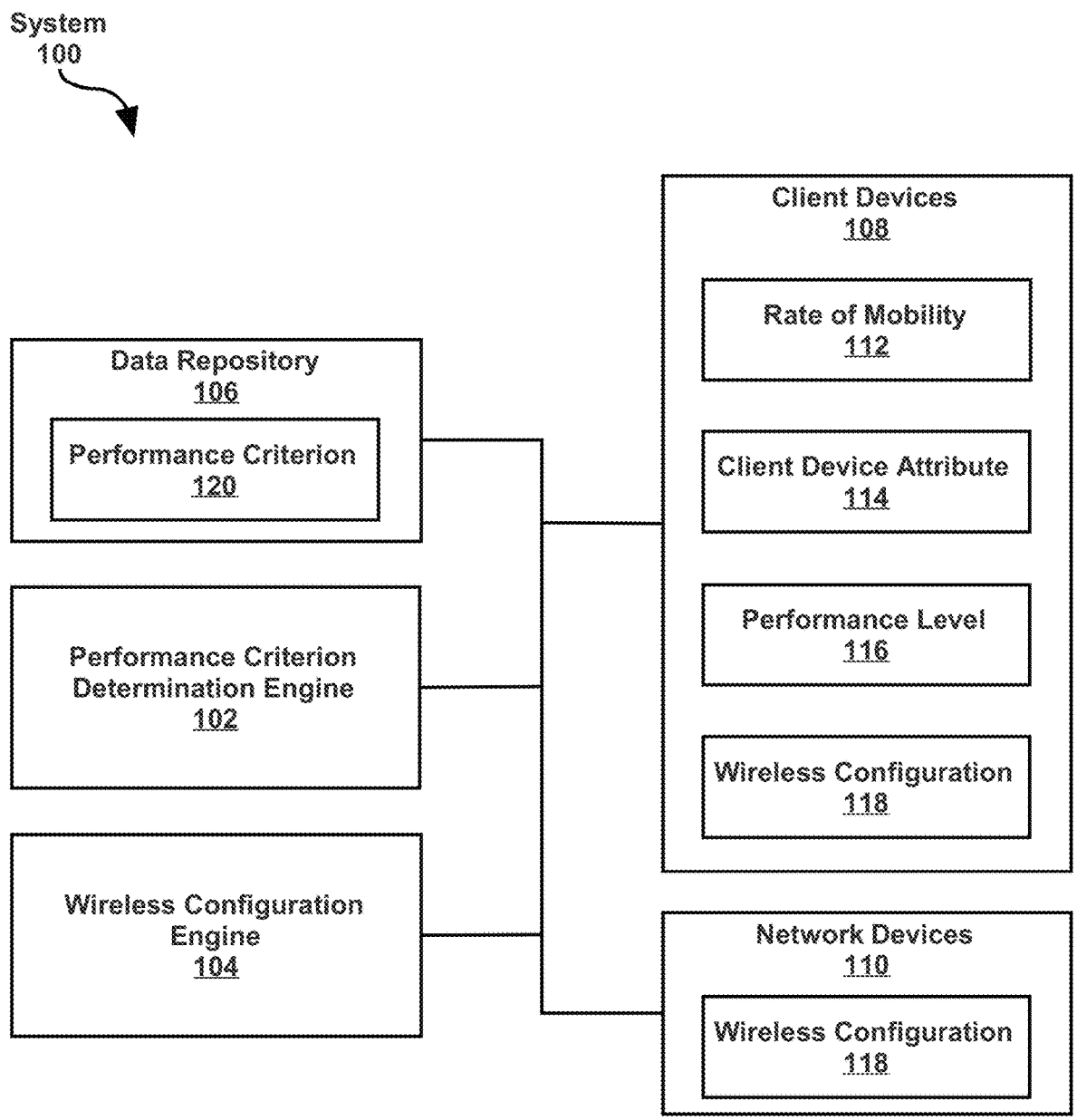
FIG. 1 illustrates a system in accordance with one or more embodiments.

FIG. 1 illustrates a system 100 in accordance with one or more embodiments. As illustrated in FIG. 1, system 100 includes client devices 108, network devices 110, a performance criterion determination engine 102, a wireless configuration engine 104, and a data repository 106. In one or more embodiments, system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In an embodiment, system 100 may be implemented or executed as part of an Expert system, Rule-Based system, Self-Learning system, or Machine-Learning system, which implements Machine Intelligence or Artificial Intelligence techniques. System 100 may be executed and/or distributed on one or more network devices 110 that are local to a wireless environment provided by the network devices 110. Additionally or alternatively, system 100 may be executed and/or distributed on one or more digital devices that are remote from the wireless environment, such as a controller implemented in a cloud environment.

In one or more embodiments, a network device 110 is a digital device that facilitates communications between a client device 108 and a network resource. A network device 110 may receive information from a client device 108 and transmit the information to a network resource. Additionally or alternatively, a network device 110 may receive information from a network resource and transmit the information to a client device 108.

The term "digital device" generally refers to any hardware device that includes a processor. A digital device may refer to a physical controller device or a hardware device executing a virtual controller. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, a Remote Authentication Dial-In User Service (RADIUS) server, a Lightweight Directory Access Protocol (LDAP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant (PDA), a wireless receiver and/or transmitter, a base station, a communication management device, a router, a switch, a cloud server, a cloud controller, a controller, and an Access Point (AP) (including a wireless AP).

A digital device may be a wireless device. A wireless device is configured to exchange information with another digital device, without being connected by an electrical conductor to the other digital device. A wireless device includes one or more radios that transmit and/or receive radio waves. Data may be encoded on a radio wave based on a communications protocol, such as the IEEE 802.11 standard. An example of a wireless network device is a wireless AP.

A network device 110 may be associated with one or more wireless configurations 118. Examples of wireless configurations 118 of a network device 110 include but are not limited to a transmit power, a Modulation and Coding Scheme (MCS) or a Physical Layer (PHY) rate, a probe response threshold, a disassociate threshold, a receive sensitivity, a receive gain, a transmit cell size, a receive cell size, and a radio frequency (RF) channel.

In one or more embodiment, a client device 108 is configured to communicate wirelessly with a network device 110. A client device 108 may receive information from a network resource through a network device 110. Additionally or alternatively, a client device 108 may transmit information to a network resource through a network device 110.

As an example, a client device 108 may connect to a network resource through a network device 110. By connecting to the network resource, the client device 108 may receive web traffic, voice data streams, video data streams, and/or any other type of data.

As another example, a client device 108 may be located in a wireless environment without actively seeking to connect to a network resource. An Internet of Things (IoT) or Internet of Everything (IoE) environment may comprise a network of digital devices, each having particular functionality to sense, collect, monitor, detect, analyze, process, transmit, receive, and/or exchange data. An IoT or IoE device, operating in power-save mode, may not actively seek to connect to a network resource. The IoT or IoE device may periodically wake up to receive broadcast data from one or more network devices. The IoT or IoE device may use broadcast data to determine whether data addressed to the IoT or IoE device was transmitted within the prior period. The IoT or IoE device may connect to a network resource only upon a particular trigger.

A client device 108 may be associated with one or more wireless configurations 118. Examples of wireless configurations 118 of a client device 108 include but are not limited to a transmit power, a transmit cell size, a receive cell size, a MCS or PHY rate, a retry rate, an aggregation size, and an association with a particular AP.

A client device 108 may be associated with a rate of mobility 112. A rate of mobility 112 is a measure associated with a movement of the client device 108. A rate of mobility may be, for example, a speed and/or velocity at which a client device is moving. Additionally or alternatively, a rate of mobility 112 is a measure associated with a movement of other wireless devices relative to the client device 108. The client device 108 itself may not be moving. As an example, a client device may be in a mesh network or peer-to-peer network, whether other wireless devices are moving. As another example, client devices may be involved in an inter-vehicle communication, where client devices on moving vehicles communicate wirelessly with each other.

Rate of mobility 112 may be measured using various metrics. As an example, a change in the received signal strength of wireless signals may represent a rate of mobility. A first AP may determine that a received signal strength indicator (RSSI) of a particular client device is decreasing at 2 dB per second for three consecutive time intervals. A second AP may determine that an RSSI of the particular client device is increasing at a same rate, 2 dB per second, for the same time intervals. The change in the RSSI at the first AP and the second AP indicates that the particular client device is moving away from the first AP towards the second AP at a particular rate of mobility. The change in the RSSI is an indirect measurement of the particular rate of mobility. As another example, a change in a data rate, MCS, retry rate, and/or another metric may represent a rate of mobility.

A client device 108 may be associated with a client device attribute 114. A client device attribute 114 may be a characteristic of a client device 108 that is not modifiable by a network device 110. As an example, a client device attribute 114 may be an operating system or application (or a particular version thereof) executing on the client device 108. The operating system or application is provided by a third-party and not modifiable by a network device 110. Additional examples of client device attributes 114 include: a device manufacturer, a device model, and a device type.

As another example, a client device attribute 114 may be a level of interference that is caused by a third-party device and detected by the client device 108. As another example, a client device attribute 114 may be a geographical location of the client device 108. The geographical location of the client device 108 is determined by a user of the client device 108, and not modifiable by a network device 110.

A client device 108 may be associated with a performance level 116. A performance level 116 is a measurement and/or detection of an attribute relating to a wireless connection associated with the client device 108. Examples of performance levels 116 include but are not limited to:

(a) whether a client device 108 is associated with an AP in a wireless environment;

(b) whether a client device is able to connect to an AP with a specific configuration (the specific configuration including, for example, a particular RF channel, a particular security level, a particular band, and/or a particular AP);

(c) whether a client device lost a connection to an AP;

(d) an amount of time needed for a client device 108 to associate with an AP;

(e) an amount of time needed for a client device 108 to switch from associating with a first AP to associating with a second AP;

(f) a received signal strength or Signal-To-Noise Ratio (SNR) of wireless signals exchanged between a client device 108 and an AP;

(g) a rate at which data is exchanged between a client device 108 and an AP;

(h) a Modulation and Coding Scheme (MCS) or Physical Layer (PHY) rate at which data is exchanged between a client device 108 and an AP;

(i) an error rate associated with the data exchanged between a client device 108 and an AP;

(j) an aggregation state associated with the data packets exchanged between a client device 108 and an AP;

(k) a beam-forming state associated with a client device 108 and an AP at any particular time;

(l) a Multi-User Multiple-Input and Multiple-Output (MU-MIMO) state associated with a client device 108;

(m) whether a client device 108 has a connectivity related issue (such as, seeking to associate with alternate APs at a rate that is above a specified threshold, or connecting and disconnecting from certain APs at a rate that is above a specified threshold);

(n) whether a client device 108 is optimally connected to a network resource (such as, using an optimal band, using an optimal RF channel, and/or associating with an optimal AP);

(o) an amount of interference (such as co-channel interference, overlapping channel interference, and/or non-Wi-Fi interference) detected, on a particular RF channel or RF band, by a client device 108; and (p) an application-specific quality associated with a particular application of a client device 108 (such as a mean opinion score (MOS) of an audio or video stream, or a measure of delay or jitter of an audio or video stream).

In one or more embodiments, data repository 106 is any type of storage unit and/or device (e.g., a file system, database, collection of tables, or any other storage mechanism) for storing data. Further, data repository 106 may include multiple different storage units and/or devices. The multiple different storage units and/or devices may or may not be of the same type or located at the same physical site. Further, data repository 106 may be implemented or may execute on the same computing system as performance criterion determination engine 102 and/or wireless configuration engine 104. Alternatively or additionally, data repository 106 may be implemented or executed on a separate computing system than performance criterion determination engine 102 and/or wireless configuration engine 104. Data repository 106 may be connected to performance criterion determination engine 102 and/or wireless configuration engine 104 via a direct connection or via a network.

A data set describing performance criterion 120 may be implemented across any of components within system 100. However, the data set is illustrated within data repository 106 for purposes of clarity and explanation.

In one or more embodiments, performance criterion 120 is a minimum performance level that is desired to be achieved by a client device 108. Performance criterion 120 may be associated with a criterion type. Different criterion types use different characteristics associated with a client device 108 to evaluate a performance of the client device 108. Examples of types of performance criteria 120 include but are not limited to:

(a) a maximum amount of time needed for a client device 108 to switch from associating with a first AP to associating with a second AP;

(b) a minimum received signal strength or SNR of wireless signals exchanged between a client device 108 and an AP;

(c) a minimum rate at which data is exchanged between a client device 108 and an AP;

(d) ability of a client device 108 to connect to an AP;

(e) ability of a client device 108 to maintain connectivity to an AP;

(f) a maximum level of tolerable interference, on a particular RF channel or RF band, detected by a client device 108;

(g) ability of a client device 108 to use beam-forming or a certain beam-forming parameter;

(h) ability of a client device 108 to implement MU-MIMO techniques and/or be part of a specific MU-MIMO group;

(i) a maximum deviation across the loads of multiple APs and/or radios (load balancing);

(j) selection of an AP and/or radio, to be associated with a client device 108, that provides a best performance for one or more client devices in a wireless environment (the selection may be performed at initial connection of a client device to a network resource and/or at roaming of a client device);

(k) selection of a channel for an AP and/or radio that provides a best performance for one or more client devices in a wireless environment;

(l) selection of a cell size for an AP and/or radio that provides a best performance for one or more client devices in a wireless environment; and (m) a minimum level of an application-specific quality associated with a particular application of a client device 108.

Performance criterion 120 is associated with a threshold value. As an example, a type of a performance criterion is a minimum received signal strength of wireless signals exchanged between a client device and an AP. A threshold value for the performance criterion specifies a particular value for the minimum received signal strength, such as −50 dBm. The performance criterion indicates that a received signal strength must be greater than or equal to −50 dBm.

Performance criterion 120 indicates whether an issue or problem is occurring with a client device 108. The issue or problem may occur while the client device 108 is associated with or connected to an AP. Alternatively, the issue or problem may occur while the client device 108 is not associated with or connected to any AP.

In one or more embodiments, performance criterion determination engine 102 refers to hardware and/or software configured to perform operations described herein for determining a performance criterion 120 for a client device 108. Examples of operations for determining a performance criterion 120 are described below with reference to FIGS. 2 and 3.

Performance criterion determination engine 102 is implemented on one or more network devices 110, such as an AP. Additionally or alternatively, performance criterion determination engine 102 is implemented on one or more other digital devices, such as a cloud controller.

In one or more embodiments, wireless configuration engine 104 refers to hardware and/or software configured to perform operations described herein for modifying a wireless configuration 118 to improve a performance level 116 of a client device 108. Examples of operations for modifying a wireless configuration 118 are described below with reference to FIGS. 2 and 3.

Wireless configuration engine 104 is implemented on one or more network devices 110, such as an AP. Additionally or alternatively, wireless configuration engine 104 is implemented on one or more other digital devices, such as a cloud controller.

Figure 2:
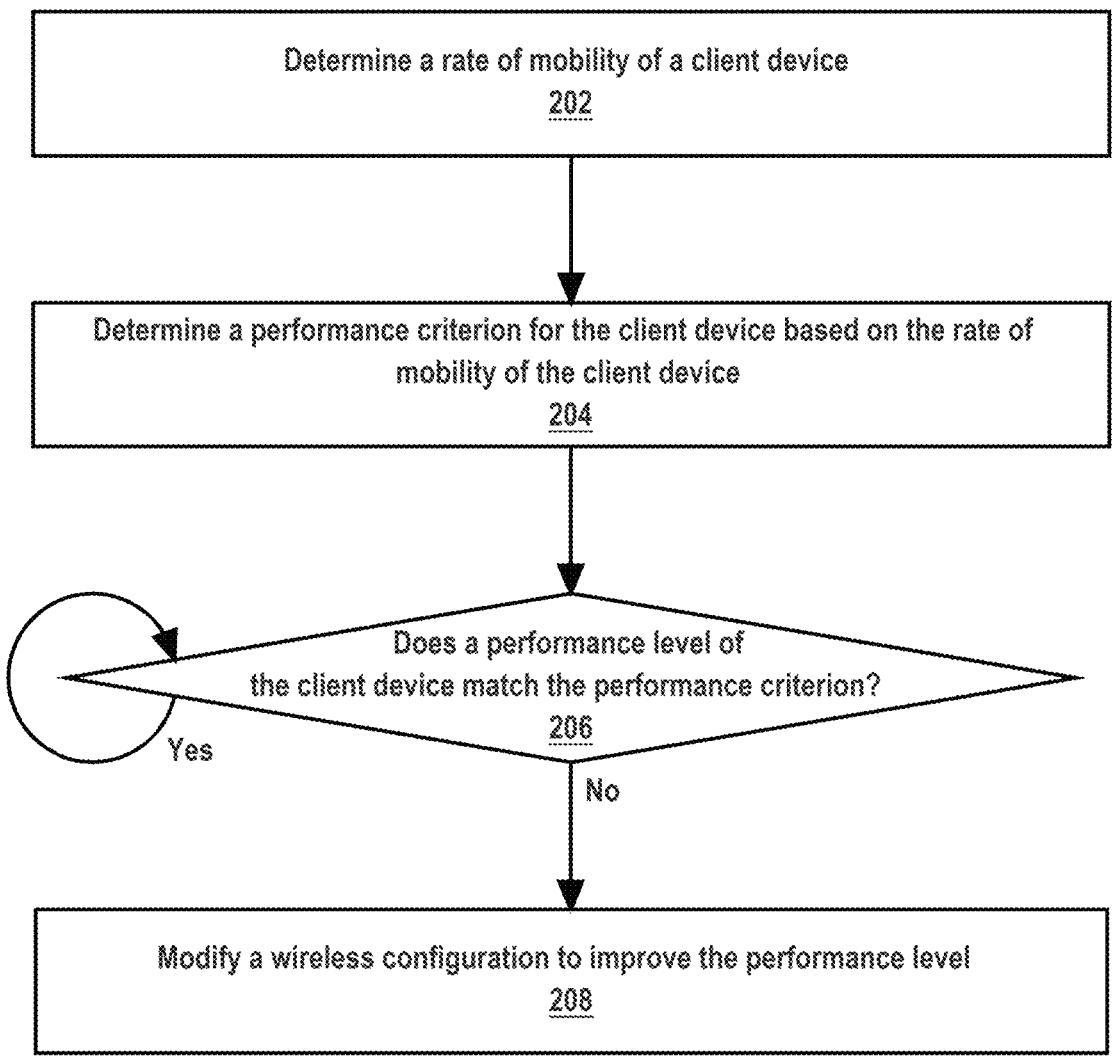
FIG. 2 illustrates an example set of operations for determining a performance criterion based on a rate of mobility of a client device, in accordance with one or more embodiments.

3. Determining a Performance Criterion Based on a Rate of Mobility of a Client Device FIG. 2 illustrates an example set of operations for determining a performance criterion based on a rate of mobility of a client device, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include determining a rate of mobility of a client device (Operation 202). A rate of mobility may be determined in various ways.

A. Determining a Rate of Mobility Based on a Physical or RF Location of a Client Device Over a Current Time Period In an embodiment, a rate of mobility is determined based on a physical or RF location of the client device detected over a current time period.

A physical location of a client device may be identified in various ways. A physical location of a client device may be self-reported by the client device (for example, using a Global Positioning System (GPS) attached to the client device).

Alternatively, a physical location of a client device may be computed or estimated based on a signal strength of a wireless signal received by the client device and/or another wireless device. As an example, a first device may transmit a wireless signal. A second device may detect a received signal strength of the wireless signal. Based on the signal strength, and a known path loss model for the wireless environment, a distance between the first device and the second device may be determined. As another example, a particular device may detect multiple signal strengths of wireless signals received from multiple devices. Based on the signal strengths, a distance from the particular device to each of the other devices may be determined. Using triangulation and/or trilateration of the distances between the particular device and the other devices, a physical location of the particular device may be determined.

A displacement of a client device is computed as the difference between the physical location of the client device at the start of a particular time period and the physical location of the client device at the end of the particular time period. A rate of mobility of the client device may be determined as the displacement of the client device divided by the duration of the particular time period.

A RF location of a client device is the location of the client device with respect to other devices, for example, access points. As an example, the RF location of a client device may be determined using access points with omni-directional antennas. The RF location may be approximated as an overlapping region corresponding to (a) three meters from a first access point and (b) five meters from a second access point. In another example, the RF location of a client device may be determined using an access point with a directional antenna. The RF location may be approximated as four meters in a Northeast direction from an access point.

A RF location of a client device may be identified in various ways. A RF location of a client device may be determined based on a received signal strength of a wireless signal detected by the client device. Alternatively, a RF location of a client device may be determined based on the received signal strength of a wireless signal that was transmitted by the client device and detected by another device.

A rate of mobility is determined based on a change in the RF location of a client device over a particular time period. The change in the RF location may be due to a change in the physical location of the client device and/or a change in the physical location of other wireless devices. As an example, a client device detects received signal strengths of wireless signals that are transmitted by an AP. Based on the received signal strengths, a change in RF location of the client device is determined over a particular time period. A rate of mobility is computed as the change in the RF location divided by the duration of the particular time period.

B. Determining a Rate of Mobility Based on a Physical or RF Location of a Client Device Over a Historical Time Period In an embodiment, a rate of mobility is determined based on a physical or RF location of the client device detected over a historical time period. A historical time period is a time period that is before a current time period at which a rate of mobility is desired to be determined. The historical time period and the current time period are associated with a common attribute, for example, a same time of day, or a same day of week. As an example, a current time period, at which a rate of mobility is to be determined, is January 5 at 10:00 am. A historical time period associated with the current time period may be January 4 at 10 a.m. Both the current time period and the historical time period are at a same time of day, which is 10 a.m.

A rate of mobility of a client device over a historical time period is determined based on the physical or RF location of the client device over the historical time period. The rate of mobility over the historical time period is used to estimate a rate of mobility over a current time period. The current rate of mobility may be, for example, an average of the historical rates of mobility.

As an example, a current time period, at which a rate of mobility is to be estimated, is January 5 at 10 am. A first historical rate of mobility was determined at January 4 at 10 a.m. The first historical rate of mobility indicates that an RSSI of the client device was decreasing at 3 dB per second. A second historical rate of mobility was determined at January 3 at 10 a.m. The second historical rate of mobility indicates that an RSSI of the client device was decreasing at 1 dB per second. An average of the historical rates of mobility would indicate that an RSSI of the client device is decreasing at 2 dB per second. An estimated current rate of mobility is represented by the decrease in the RSSI at a rate of 2 dB per second.

C. Determining a Rate of Mobility Based on a Device Type of a Client Device

In an embodiment, a rate of mobility is determined based on a device type of a client device. A device type of a client device may be self-reported by the client device. Alternatively, a device type of a client device may be determined based on the information transmitted to and from the client device. As an example, information transmitted by a client device may include the capabilities of the device such as its ability to print documents. Based on the decoded information, the client device is determined to be a printer. Similarly, DHCP fingerprinting may be used to determine the type and/or model of the device.

The device type of the client device is compared to a list of device types that are known to be stationary. The list of stationary device types may have been input by a user and/or stored in a data repository. Examples of stationary device types include a printer, and a desktop computer. If the device type of the client device is found within the list of stationary device types, then the client device is determined to be stationary. A rate of mobility of such client device is typically zero, unless the mobility is triggered by changes in the environment.

Continuing with FIG. 2, one or more embodiments include determining a performance criterion for the client device based on the rate of mobility of the client device (Operation 204). A type of a performance criterion may be determined based on the rate of mobility. Additionally or alternatively, a threshold value used by a performance criterion may be determined based on a rate of mobility.

A mapping between performance criteria and rates of mobility may be stored in a data repository. The mapping may be stored in various forms, such as a table, a list, a set of rules, and/or a set of logic statements. The mapping may be fixed, or may be dynamically updated based on machine learning and/or artificial intelligence. The mapping indicates the criterion type and/or threshold value of a performance criterion that is applicable to the client device based on a rate of mobility of the client device. The mapping indicates different performance criteria based on different rates of mobility.

As an example, a mapping specifies a first performance criterion corresponding to a higher rate of mobility, and a second performance criterion corresponding to a lower rate of mobility. The first performance criterion requires a minimum rate at which data is exchanged between a client device and an AP to be 50 Mbps. The second performance criterion requires that a minimum rate be 80 Mbps. The second performance criterion has a higher threshold than the first performance criterion because a higher data rate is expected at a lower rate of mobility.

As another example, a mapping specifies a first performance criterion corresponding to a higher rate of mobility, and a second performance criterion corresponding to a lower rate of mobility. The first performance criterion requires that a maximum amount of time needed for the client device to switch from associating with a first AP to a second AP is 0.1 seconds. The second performance criterion requires that a minimum rate at which data is exchanged between a client device and an AP is 50 Mbps. The first performance criterion and the second performance criterion relate to different criterion types. The first performance criterion relates to a roaming rate because roaming typically occurs at higher rates of mobility. The second performance criterion relates to a data rate, rather than roaming rate, because roaming typically does not occur at lower rates of mobility.

In an embodiment, a particular performance criterion is selected or deselected for a client device based on a rate of mobility of the client device. As an example, a particular performance criterion is an ability of a client device to maintain connectivity with an AP. The ability to maintain connectivity may not be applicable to client devices with a rate of mobility above a specified threshold. Hence, the particular performance criterion is selected for application to a particular client device, if the rate of mobility of the particular client device is below the specified threshold. The particular performance criterion is deselected and not applied to a particular client device, if the rate of mobility of the particular client device is above the specified threshold.

In an embodiment, a performance criterion applicable to a client device changes based on a change in the rate of mobility of the client device. The performance criterion is modified based on a change in the rate of mobility. As an example, while a client device is stationary, a particular performance criterion is determined for the client device. After the client device begins to move with a particular rate of mobility, a different performance criterion is determined for the client device.

One or more embodiments include inquiring whether a performance level of the client device matches the performance criterion (Operation 206).

In an embodiment, a performance level of the client device is detected by that client device itself, another client device, and/or a network device. The performance level of the client device may be detected while the client device is associated with an AP, or while the client device is not associated with any AP.

As an example, a particular client device is associated with a particular AP. The particular AP detects a wireless signal from the particular client device at a particular signal strength. The particular AP also detects a particular noise floor. A signal-to-noise ratio (SNR) is determined based on the particular noise floor and the particular signal strength. The SNR is determined as a performance level.

As another example, a particular client device is associated with a first AP. The particular client device detects a wireless signal from the first AP at a first signal strength. The first signal strength is below a specified threshold value, indicating that the particular client device should disassociate with the first AP and associate with another AP if possible. The particular client device also detects a wireless signal from a second AP at a second signal strength. The second signal strength is above the specified threshold value, indicating that the client device may associate with the second AP. The client device disassociates with the first AP. The first AP determines a time at which the disassociation occurs. The client device then associates with the second AP. The second AP determines a time at which the association occurs. The duration between the time at which the disassociation with the first AP occurs and the time at which the association with the second AP occurs is determined as an amount of time needed for the particular client device to switch from associating with the first AP to associating with the second AP. The amount of time needed for the particular client device to switch from the first AP to the second AP is determined as a performance level.

In an embodiment, the performance level of the client device is compared to the performance criterion determined for the client device to determine whether there is a match.

A performance criterion may specify a maximum threshold value and/or a minimum threshold value that must be satisfied. A match is found if the performance level is below the maximum threshold value and/or below the minimum threshold value. As an example, a performance criterion specifies that a maximum level of tolerable interference on a particular RF channel is −70 dBm. A particular client device detects a level of interference on the particular RF channel at −80 dBm, which is below the maximum threshold value. Hence, the performance level of the client device matches the performance criterion.

Alternatively, a performance criterion may specify a particular statement of fact that must be found to be true. As an example, a performance criterion is that a client device within a particular physical area must be associated with one of a set of APs. A particular AP, in the set of APs, detects a wireless signal from a particular client device at a particular signal strength. Based on the particular signal strength, the particular client device is determined to be within the particular physical area. However, the particular client device is not associated with any of the set of APs. Hence, the statement that a client device within the particular physical area is associated with the set of APs is false. The performance level of the client device does not match the performance criterion.

In one or more embodiments, if the performance level matches the performance criterion, then the inquiry at Operation 204 continues to be made. The performance level of the client device is detected periodically, for example, at 15-second intervals. The performance level detected at each time interval is again compared to the performance criterion.

In one or more embodiments, if the performance level does not match the performance criterion, then a wireless configuration is modified to improve the performance level of the client device (Operation 208). A performance level that does not match the performance criterion indicates that a wireless connectivity problem associated with the client device has occurred. A wireless connectivity problem may be a problem of a client device that is associated with an AP (the problem is likely a performance issue). Alternatively, a wireless connectivity problem may be a problem of a client device that is not associated with any AP (the problem is likely a connectivity issue). A wireless configuration is modified to ameliorate or resolve the problem.

The wireless configuration to be modified may be determined using a set of rules stored at a data repository. The set of rules specify a particular wireless configuration to be modified based on the type of the performance criterion that was not satisfied, the amount of mismatch between the performance level and the performance criterion, and/or other factors. The set of rules may be stored in various forms, such as a table, a list, and/or a set of logic statements.

As an example, a particular performance criterion, for a client device associated with a particular AP, is that the client device must receive a wireless signal that is transmitted from the particular AP at a signal strength above −60 dBm. A modification to a first wireless configuration is to increase a transmit cell size of the particular AP. Another modification to a second wireless configuration is to disassociate the client device from the particular AP and associate the client device with another AP.

Continuing the example, a set of rules specifies which of the two wireless configurations is to be modified based on the mismatch between a detected signal strength and the minimum signal strength of −60 dBm. If the difference between a detected signal strength and the minimum signal strength of −60 dBm is within a specified threshold, then the modification to the first wireless configuration applies. By increasing the transmit cell size of the particular AP, the detected signal strength may be increased to be above −60 dBm.

In contrast, if the difference between a detected signal strength and the minimum signal strength is above the specified threshold, then the modification to the second wireless configuration applies. The client device may associate with another AP. The client device may detect a wireless signal that is transmitted by the other AP at a signal strength that is greater than −60 dBm.

Figure 3:
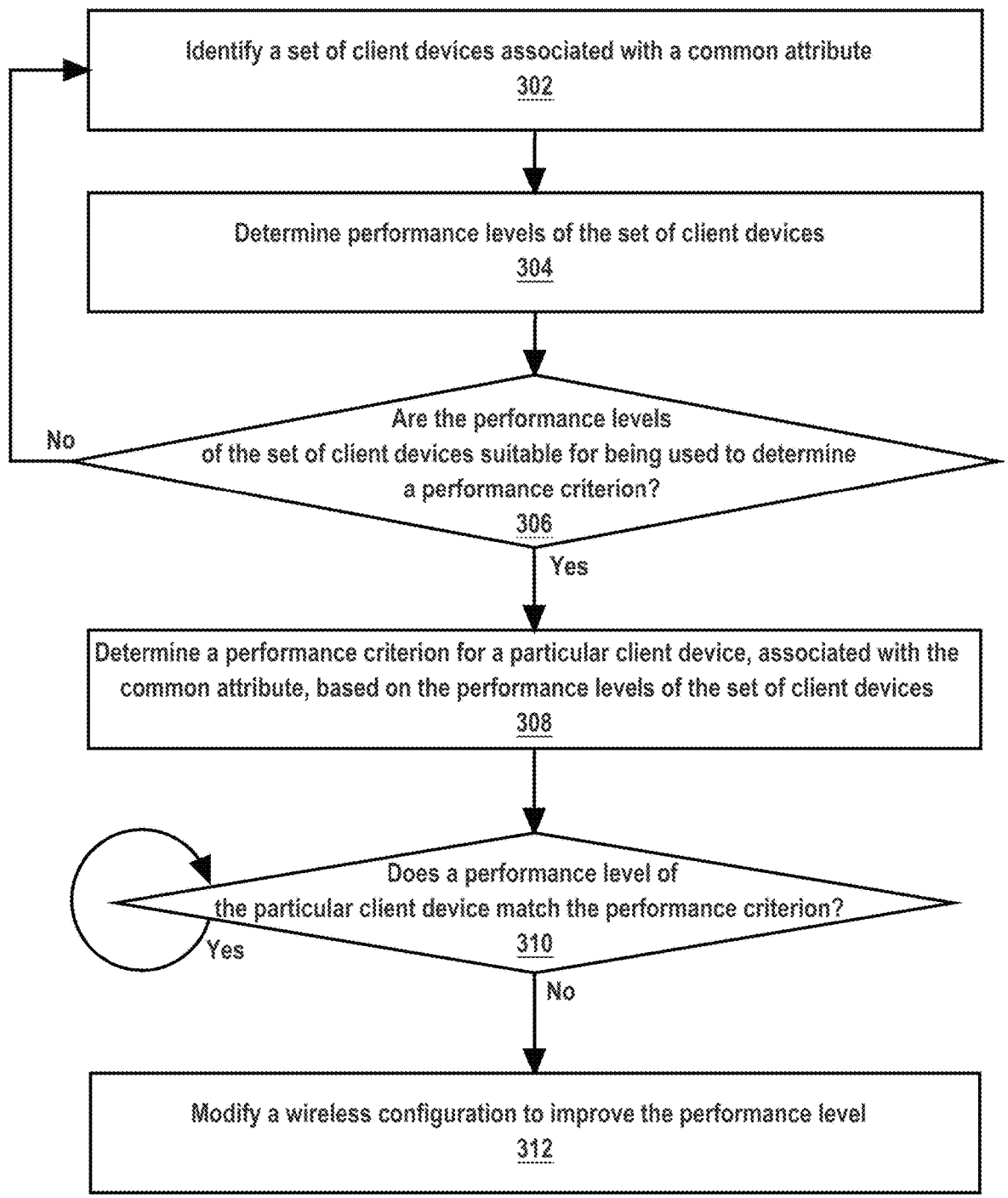
FIG. 3 illustrates an example set of operations for determining a performance criterion based on performance levels of a set of client devices associated with a common attribute, in accordance with one or more embodiments.

4. Determining a Performance Criterion Based on Performance Levels of a Set of Client Devices Associated with a Common Attribute FIG. 3 illustrates an example set of operations for determining a performance criterion based on performance levels of a set of client devices associated with a common attribute, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include identifying a set of client devices associated with a common attribute (Operation 302). An attribute of a client device may be determined in various ways. An attribute of a client device may be self-reported by the client device itself. As an example, a client device may transmit a wireless signal indicating a particular version of an operating system that is being executed by the client device. The particular version of the operating system is determined as an attribute associated with the client device.

As another example, a client device may transmit a wireless signal indicating a particular level of interference detected on a particular RF channel. The particular level of interference on the particular RF channel is determined as an attribute associated with the client device.

Alternatively, an attribute of a client device may be determined or inferred based on a wireless signal transmitted by the client device. As an example, a client device may execute a particular application. Requests from the particular application may be addressed to a particular network resource. The client device transmits wireless signals enclosing the requests that are addressed to the particular network resource. Based on the particular network resource indicated in the wireless signals, the particular application executing on the client device may be identified. The particular application is determined as an attribute associated with the client device.

Attributes of multiple client devices are determined. A set of client devices associated with a common attribute is identified. As an example, locations of multiple client devices may be determined. The client devices may be located within a same geographical region. The client devices are identified as a set of client devices associated with a common attribute.

One or more embodiments include determining performance levels of the set of client devices associated with the common attribute (Operation 304). A performance level of a client device is detected by that client device itself, another client device, and/or a network device. Examples of operations for determining a performance level of a client device is described above with reference to Operation 206 of FIG. 2.

One or more embodiments include determining whether the performance levels of the set of client devices are suitable for being used to determine a performance criterion (Operation 306). The performance levels of the set of client devices are suitable if one or more criteria are satisfied.

In an embodiment, a criterion is that a number of client devices in the set of client devices associated with a common attribute is above a specified threshold. If the number of client devices in the set of client devices is below the specified threshold, then the set of client devices do not provide sufficient data for determining a performance criterion. The performance levels of the set of client devices are not suitable for being used to determine a performance criterion. If the number of client devices is above the specified threshold, then the performance levels of the set of client devices may be suitable for being used to determine a performance criterion.

In an embodiment, a criterion is that a correlation across the performance levels of the set of client devices is below a specified threshold. If the correlation is above the specified threshold, then the set of client devices associated with the common attribute are not performing in a similar fashion. The performance levels of the set of client devices are not suitable for being used to determine a performance criterion. If the correlation is below the specified threshold, then the performance levels of the set of client devices may be suitable for being used to determine a performance criterion.

In one or more embodiments, if the performance levels of the set of client devices are not suitable for being used to determine a performance criterion, then Operation 302 and/or Operation 304 may be repeated. Attributes of client devices may be again identified to determine a different set of client devices associated with a common attribute. Additionally or alternatively, performance levels of the set of client devices may be again determined. The inquiry at Operation 306 may be repeated to determine whether the newly determined performance levels associated with the newly identified set of client devices are suitable for being used to determine a performance criterion.

In one or more embodiments, if the performance levels of the set of client devices are suitable for being used to determine a performance criterion, then a performance criterion for a particular client device, associated with the common attribute, is determined based on the performance levels of the set of client devices (Operation 308). An attribute of the particular client device is determined as described above with reference to Operation 302. The particular client device is determined to be associated with the common attribute that is associated with the set of client devices.

A performance criterion may specify that the particular client device must perform at or above an expected performance level of the particular client device. The expected performance level of the particular client device is determined based on the performance levels of the set of client devices associated with the common attribute.

A performance criterion for the particular client device may be determined based on an average of the performance levels of the set of client devices. As an example, Client Device X, Client Device Y, and Client Device Z are associated with a common attribute. A length of time needed, by each client device, to switch from associating with a first AP to associating with a second AP is determined. Client Device X uses 0.1 seconds, Client Device Y uses 0.2 seconds, and Client Device Z uses 0.3 seconds. An average of the lengths of time is determined to be 0.2 seconds. A performance criterion for Client Device W, which is also associated with the common attribute, is determined based on the average length of time. The performance criterion specifies that Client Device W must be able to switch from associating with a first AP to associating with a second AP within the average length of time, which is 0.2 seconds.

Additionally or alternatively, a performance criterion for the particular client device may be determined based on a change in the performance levels of the set of client devices. As an example, during a first time period, Client Device X and Client Device Y execute version 1.0 of an operating system. An AP transmits a wireless signal. Client Device X detects a received signal strength of the wireless signal at −50 dBm. Client Device Y detects a received signal strength at −45 dBm. At a second time period, Client Device X and Client Device Y execute version 2.0 of the operating system. The AP transmits another wireless signal. Client Device X detects a received signal strength of the wireless signal at −57 dBm. Client Device Y detects a received signal strength at −52 dBm. The difference in the received signal strength detected before and after the upgrade to version 2.0, for each client device, is determined to be −7 dB.

Continuing the example, Client Device Z undergoes a same change as Client Device X and Client Device Y: Client Device Z upgrades from version 1.0 to version 2.0 of the operating system. While Client Device Z executed version 1.0, a performance criterion required that Client Device Z receive a wireless signal from the AP at a minimum signal strength of −60 dBm. The performance criterion for Client Device Z after Client Device Z is upgraded to version 2.0 is determined based on the change in received signal strength of Client Device X and Client Device Y. The change in received signal strength of Client Device X and Client Device Y is −7 dB. Hence the performance criterion for Client Device Z is adjusted by −7 dB. The performance criterion for Client Device Z is modified from requiring a minimum signal strength of −60 dBm to requiring a minimum signal strength of −67 dBm.

Additionally or alternatively, a performance criterion for the particular client device may be determined based on a pattern associated with the performance levels of the set of client devices. As an example, Client Device X, Client Device Y, and Client Device Z are located in a same room, which constitutes a common attribute associated with the set of client devices. Client Device X is located on the west side of the room, Client Device Y is located in the center of the room, and Client Device Z is located on the east side of the room. A level of interference detected by Client Device X is −64 dBm, a level of interference detected by Client Device Y is −70 dBm, and a level of interference detected by Client Device Z is −76 dBm. A pattern associated with the performance levels is determined. The pattern indicates that the level of interference drops linearly from the west side to the east side of the room.

Continuing the example, Client Device W is moved into the same room. Client Device W is located between Client Device X and Client Device Y. Based on the pattern associated with the performance levels of Client Device X, Client Device Y, and Client Device Z, an expected level of interference at the location of Client Device W is determined. Since the level of interference drops linearly from the west side to the east side of the room, the expected level of interference at the location of Client Device W is determined to be −67 dBm. A performance criterion is determined for Client Device W based on the expected level of interference for Client Device W. Hence, the performance criterion requires that a level of interference detected by Client Device W is less than or equal to −67 dBm.

One or more embodiments include inquiring whether a performance level of the particular client device matches the performance criterion (Operation 310). Examples of operations for determining whether a performance level of the particular client device matches the performance criterion are described above with reference to Operation 206 of FIG. 2.

In one or more embodiments, if the performance level matches the performance criterion, then the inquiry at Operation 310 continues to be made. The performance level of the particular client device is detected periodically, for example, at 15-second intervals. The performance level detected at each time interval is again compared to the performance criterion.

In one or more embodiments, if the performance level does not match the performance criterion, then a wireless configuration is modified to improve the performance level of the particular client device (Operation 312). Examples of operations for modifying a wireless configuration to improve the performance level are described above with reference to Operation 208 of FIG. 2.

5. Example Embodiment

Figure 4B:
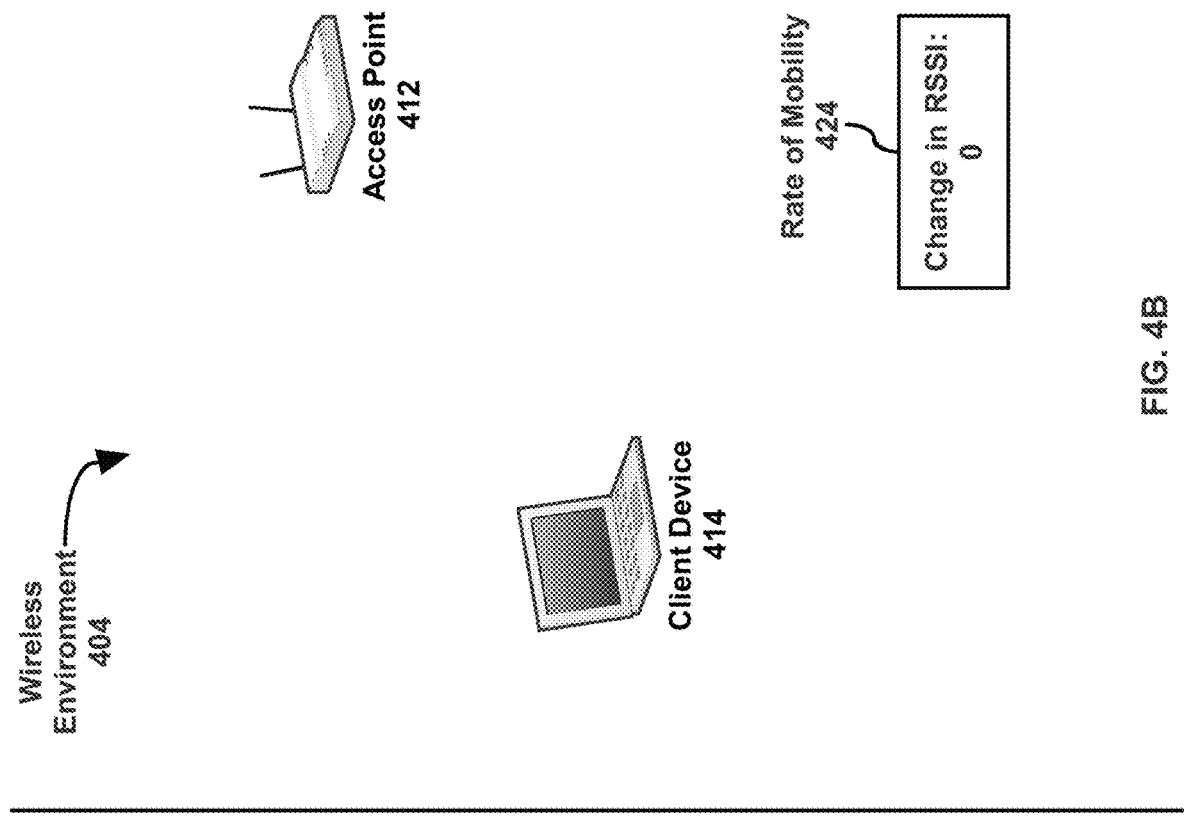
FIGS. 4A and 4B illustrate an example of determining a performance criterion for a client device, in accordance with one or more embodiments.
Figure 4A:
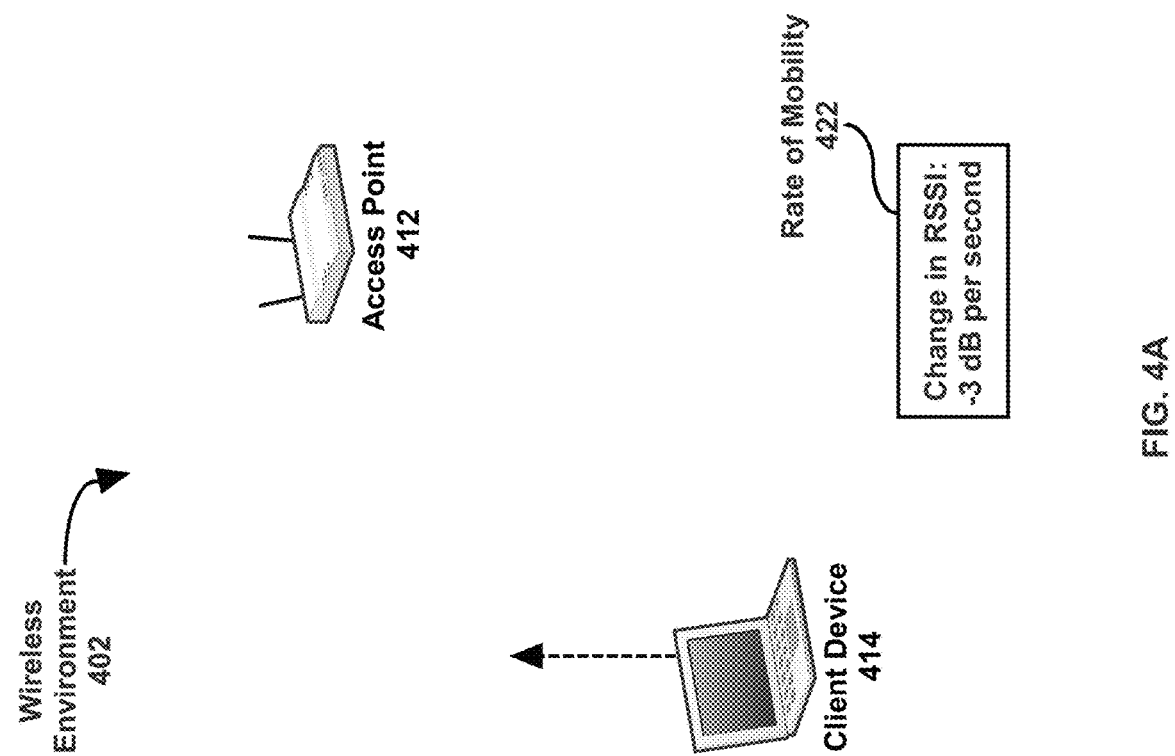

A detailed example is described below for purposes of clarity. Components and/or operations described below should be understood as one specific example which may not be applicable to certain embodiments. Accordingly, components and/or operations described below should not be construed as limiting the scope of any of the claims. FIGS. 4A and 4B illustrate an example of determining a performance criterion for a client device, in accordance with one or more embodiments.

As illustrated in FIG. 4A, a wireless environment 402 includes an access point 412 and a client device 414. At a current time period, client device 414 is moving. A rate of mobility 422 of client device 414 is determined. At a start of the current time period, client device 414 detects a wireless signal, which was transmitted from access point 412, at a signal strength of −65 dBm. At an end of the current time period, client device 414 detects a wireless signal, which was transmitted from access point 412, at a signal strength of −62 dBm. The rate of mobility may be represented as a decrease in RSSI of 3 dB per second.

A mapping between performance criteria and rates of mobility is retrieved from a data repository. A look-up of the mapping is performed to determine a performance criterion for client device 414, based on the rate of mobility 422 represented by −3 dB per second. The performance criterion specifies that a minimum signal strength, detected by client device 414, of a wireless signal transmitted by access point 412 is −65 dBm.

A performance level of client device 414 is determined. Client device 414 detects a wireless signal, which was transmitted by access point 412, at a signal strength of −62 dBm. The performance level is compared to the performance criterion, which requires a minimum signal strength of −65 dBm. The performance level satisfies the performance criterion. Modification of a wireless configuration to improve the performance level is not necessary.

Referring to FIG. 4B, at a later time period, wireless environment 404 includes the same devices, access point 412 and client device 414. Client device 414 stops moving. A rate of mobility 424 of client device 414 is determined to be zero (0).

A look-up of the mapping between performance criteria and rates of mobility is performed. The mapping specifies a different performance criterion for client device 414, based on the rate of mobility 424 of zero. The performance criterion specifies that a minimum signal strength, detected by client device 414, of a wireless signal transmitted by access point 412 is −60 dBm. The minimum signal strength required for a client device that is stationary is higher than the minimum signal strength required for a client device that is moving.

A performance level of client device 414 is determined. Client device 414 detects a wireless signal, which was transmitted by access point 412, at a signal strength of −62 dBm. The performance level is compared to the performance criterion, which requires a minimum signal strength of −60 dBm. Since the performance level does not satisfy the performance criterion, a wireless configuration is modified. The transmit power of access point 412 is increased.

A performance level of client device 414 is again determined. Client device 414 detects a wireless signal, which was transmitted by access point 412, at a signal strength of −59 dBm. The performance level has improved. The performance level satisfies the performance criterion.

6. Miscellaneous, Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
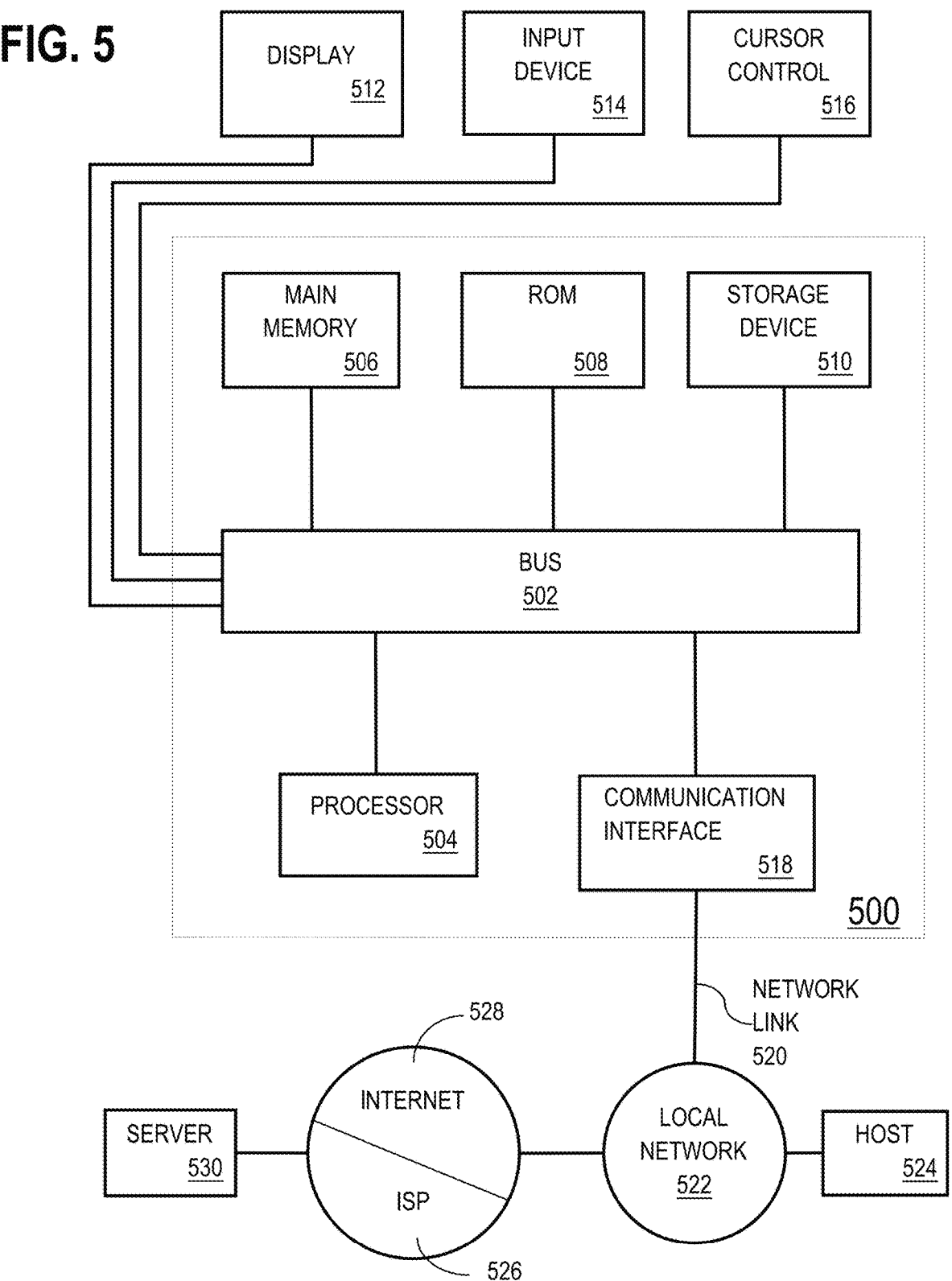
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a set of a plurality of client devices associated with a common attribute;
   determining a plurality of performance levels of the set of the plurality client devices;
   determining that the plurality of performance levels of the set of plurality of client devices are suitable for determining a performance criterion of a single particular device of the set of plurality of client devices, comprising determining that a number of client devices of the set of the plurality of client devices is greater than a specified threshold;
   determining the performance criterion for the single particular device of the set of the plurality of client devices based on a rate at which other client devices are moving relative to the single particular client device, and based on the plurality of performance levels of the set of the plurality of devices when the plurality of performance levels of the set of the plurality of client devices are determined to be suitable;
   modifying a wireless configuration to improve a performance level of the single particular device when the performance level of the single particular device does not match the performance criterion determined based on the plurality of performance levels of the set of the plurality of devices that were determined to be suitable for determining the performance criteria for the single particular device.

2. The medium of claim 1, wherein the common attribute is one of a software update of the set of client devices, a particular application executing on the set of client devices, or an external interference experienced by the set of client devices.

3. The medium of claim 1, wherein the operations to determine that the plurality of performance levels of the set of plurality of client devices are suitable for determining the performance criterion for the single particular client device further comprises:
   determining that a correlation associated with the plurality of performance levels of the set of plurality of client devices is above a threshold value.

4. The medium of claim 1, wherein determining the performance criterion for the single particular client device based on the plurality of performance levels of the set of plurality of client devices comprises:
   determining an average associated with the plurality of performance levels of the set of plurality of client devices.

5. The medium of claim 1, wherein the operations further comprise:
   determining that a wireless connectivity problem is occurring with the single particular client device; and
   modifying the wireless configuration to improve the performance level of the single particular client device.

6. The medium of claim 1, wherein the operations to determine that the plurality of performance levels of the set of plurality of client devices are suitable for determining the performance criterion for the single particular client device further comprises:
   determining whether a correlation across the plurality of performance levels of the set of plurality of client devices is below a threshold.

7. The medium of claim 1, wherein determining the performance criterion for the single particular device comprises averaging of the plurality of performance levels of the set of the plurality of devices that were determined to be suitable for determining the performance criteria for the single particular device.

8. The medium of claim 7, wherein averaging of the plurality of performance levels of the set of the plurality of devices that were determined to be suitable for determining the performance criteria for the single particular device comprises:
   determining a length of time needed for each client device to switch from associating with a first access point to a second access point; and
   averaging the length of time needed for each client device to switch from associating with the first access point to the second access point.

9. The medium of claim 8, further comprising:
   determining the performance criteria for the single particular based on the average length of time needed for each client device to switch from associating with the first access point to the second access point.

10. The medium of claim 1, wherein determining the performance criterion for the single particular device is based on changes in the plurality of performance levels of the set of the plurality of devices that were determined to be suitable for determining the performance criteria for the single particular device from a first time period to a second time period.

11. The medium of claim 10, wherein determining the performance criterion for the single particular device based on changes in the plurality of performance levels of the set of the plurality of devices that were determined to be suitable for determining the performance criteria for the single particular device from a first time period to a second time period comprises:
   a first client device detecting a first received signal strength of a wireless signal while the first client device is executing a first version of an operating system during the first time period;
   a second client device detecting a second received signal strength of a wireless signal while the second client device is executing the first version of the operating system during the first time period;
   the first client device detecting a third received signal strength of a wireless signal while the first client device is executing a second version of an operating system during the second time period;
   the second client device detecting a fourth received signal strength of a wireless signal while the second client device is executing the second version of the operating system the second time period;
   determining a difference in received signal strength for the first client device and the second client device before and after upgrading to the second version of the operating system; and
   modifying the performance criteria for the single particular device based on the difference in received signal strength for the first client device and the second client device before and after upgrading to the second version of the operating system.

12. The medium of claim 1, wherein determining the performance criterion for the single particular device is based on patterns of the plurality of performance levels of the set of the plurality of devices that were determined to be suitable for determining the performance criteria for the single particular device.

13. The medium of claim 12, wherein determining the performance criterion for the single particular device based on patterns of the plurality of performance levels of the set of the plurality of devices that were determined to be suitable for determining the performance criteria for the single particular device, comprises:
- detecting interference by a first client device located in a first location of a room;
- detecting interference by a second client device location in a second location of the room;
- identifying a pattern of the interference within the room based on the interference detected by the first client device and the interference detected by the second client device; and
- determining the performance criterion for the single particular device when the single particular device is located in room the based on the identified pattern of the interference within the room.

14. The medium of claim 1, wherein when the plurality of performance levels of the set of plurality of client devices are determined not to be suitable for determining a performance criterion of a single particular device of the set of plurality of client devices repeating the determination.

15. A non-transitory computer readable medium comprising instructions which, when executed by one or more hardware processors, causes performance of operations comprising:
- identifying a set of a plurality of client devices associated with a common attribute;
- determining a plurality of performance levels of the set of the plurality client devices;
- determining that the plurality of performance levels of the set of plurality of client devices are suitable for determining a performance criterion of a single particular device of the set of plurality of client devices, comprising determining that a number of client devices of the set of the plurality of client devices is greater than a specified threshold;
- determining the performance criterion for the single particular device of the set of the plurality of client devices based on a rate at which other client devices are moving relative to the single particular client device, and based on the plurality of performance levels of the set of the plurality of devices when the plurality of performance levels of the set of the plurality of client devices are determined to be suitable;
- modifying a wireless configuration to improve a performance level of the single particular device when the performance level of the single particular device does not match the performance criterion determined based on the plurality of performance levels of the set of the plurality of devices that were determined to be suitable for determining the performance criteria for the single particular device.

16. The medium of claim 15, wherein determining the performance criterion for the single particular device comprises averaging of the plurality of performance levels of the set of the plurality of devices that were determined to be suitable for determining the performance criteria for the single particular device.

17. The medium of claim 15, wherein determining the performance criterion for the single particular device is based on changes in the plurality of performance levels of the set of the plurality of devices that were determined to be suitable for determining the performance criteria for the single particular device from a first time period to a second time period.

18. The medium of claim 15, wherein determining the performance criterion for the single particular device is based on patterns of the plurality of performance levels of the set of the plurality of devices that were determined to be suitable for determining the performance criteria for the single particular device.

* * * * *